(12) United States Patent
Wolf (10) Patent No.: US 6,812,861 B1
(45) Date of Patent: Nov. 2, 2004

(54) METHOD FOR AUTOMATICALLY GENERATING SEVERAL ELECTRICAL PULSES USING NUMERIC DEFAULT VALUES, IN PARTICULAR FOR STIMULATING AN INCREMENTAL ENCODER

(75) Inventor: Roland Wolf, Mistelgau (DE)

(73) Assignee: Baumuller Anlagen-Systemtechnik GmbH & Co., Nuremberg (DE)

( * ) Notice: Subject to any disclaimer, the term of this patent is extended or adjusted under 35 U.S.C. 154(b) by 0 days.

(21) Appl. No.: 10/311,118
(22) PCT Filed: Sep. 27, 2000
(86) PCT No.: PCT/DE00/03373
§ 371 (c)(1), (2), (4) Date: Apr. 28, 2003
(87) PCT Pub. No.: WO01/98878
PCT Pub. Date: Dec. 27, 2001

(30) Foreign Application Priority Data

Jun. 16, 2000 (DE) .......................... 100 28 973

(51) Int. Cl.[7] .............................................. H03M 1/22
(52) U.S. Cl. ............................................ 341/11; 341/9
(58) Field of Search ................................ 341/11, 9, 112

(56) References Cited

U.S. PATENT DOCUMENTS 3,882,426 A * 5/1975 Hoeschele, Jr. ............. 341/143
6,058,358 A * 5/2000 Streichert ................... 702/151
6,501,403 B2 * 12/2002 Weibel et al. .............. 341/120

\* cited by examiner

Primary Examiner—Peguy JeanPierre
(74) Attorney, Agent, or Firm—Frank H. Foster; Kremblas, Foster, Phillips & Pollick (57) ABSTRACT

The invention relates to a method for automatically generating several electrical pulses using numeric default values, in particular for simulating an incremental encoder for a sequential, digital counting of linear or angular displacement values using said pulses. The method incorporates a value generator that outputs the default values repeatedly within each first cycle time, calculation and control means that detect the default values in a cyclic manner and a pulse switching interface that has one or more outputs for the pulses. The program and/or circuitry of the calculation and control means are designed:—for detecting the respective current default value and for determining a differential value from the current and preceding default value or incremental value for each first cycle time, said value having been previously counted in ascending or descending order, according to preceding default values,—for converting the differential value into control signals for the pulse switching interface within several second cycle times, whose total duration does not exceed the first cycle time of the value generator,—and for measuring the number or frequency of the pulses or pulse edges, according to the respective differential value.

15 Claims, 6 Drawing Sheets

METHOD FOR AUTOMATICALLY GENERATING SEVERAL ELECTRICAL PULSES USING NUMERIC DEFAULT VALUES, IN PARTICULAR FOR STIMULATING AN INCREMENTAL ENCODER

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The invention relates to a process for automatic generation of several electrical pulses using numeric default values, which process is particularly suitable for simulating an incremental encoder for sequential digital counting of pulses, where the counter result corresponds to linear or angular displacement values. A value generator is used which generates and outputs the default values repeatedly within allocated first cycle times. The default values are then used by cyclic detection, calculation and control means and a pulse switching interface controlled thereby which has one or more outputs for the pulses or pulse sequences. The invention further relates to a digital electronic data processing apparatus suitable for performance of the said process.

2. Description of the Related Art

Processes for generating parallel electrical pulse sequences are used in incremental methods of length and angle measurement (see e.g. Alfons Ernst "Digital Length and Angle Measurement Technology" Verlag Moderne Industrie, Landsberg/Lech, page 8 ff). Sinusoidal sampling signals offset by 90° to each other are converted by means of comparators into rectangular pulses giving two pulse sequences phase offset by 90° to each other. These are supplied to a counter in which counting pulses are first derived from the signal flanks. At the same time the signals are passed to a direction discriminator which determines the counting direction and passes the counting pulses to the plus or minus input of an up and down counter. The counting result corresponds to the displacement path and can be shown in a display or supplied to a computer or controller. Such processes for determining the displacement path by counting pulses or measurement steps are known as incremental measurement processes.

Resolvers are also known which in conjunction with a suitable analysis circuit can implement an absolute measurement system within one revolution. By means of interpolation, measurement steps can be generated which are less than one-quarter of the period of the sampled signals. Known interpolators provide not only the interface for the absolute measurement system but optionally also an incremental interface to allow use in conjunction with conventional controls.

In particular in connection with the use of resolvers as position encoders it is known to simulate and output incremental encoder signals for subsequent control electronics (see DE journal "Electronics", Vol. 8/1994, page 48, page 60). Here the incremental encoder simulation is normally achieved using a position control circuit which outputs as a variable a set frequency for a frequency generator. Reference is made to the description below of FIG. 1 for further details. One disadvantage of this known solution is that this is a control circuit which can only work if a control deviation is present. Thus in the least favorable case, depending on the selected dynamics of the controller, even when stopped i.e. if an unchanging position is to be shown, a very high output frequency (up to more than 1 MHz by toggling of a track) can be present, which is difficult for following electronics to interpret. This time behavior of the control circuit can lead to an undesirable inherent dynamic of the entire adjustment and control system dependent on the incremental encoder simulation. A further disadvantage lies in the use of the frequency generator, the output pulses of which reflect only a nominal or set frequency but do not have a direct relation to the position default values for simulating the incremental encoder. Furthermore the necessary hardware expense cannot be ignored: as well as a position controller, a frequency generator and a counter module, summing points are also required (see FIG. 1 below). To remedy this, implementation of the control circuit in an existing signal processor is possible but this only allows limited sampling times in conjunction with a restricted frequency range, reduced resolution and non-optimum precision.

BRIEF SUMMARY OF THE INVENTION

The invention is based on the object of specifying a process for incremental encoder simulation with increased resolution and precision, increased stability and operating reliability and a reduced complexity of the necessary hardware. The simulation should also be able to work with improved dynamics, where an improved linearity can be achieved in the correlation between the position change and the output pulse frequency. In addition the process primarily intended for incremental encoder simulation can be used outside this area of application as a general pulse-generating process for a multiplicity of further possible uses.

The object is achieved in a process with the features cited initially, in that the program and/or circuitry of the calculation and control means are designed:

to detect the current default value and determine the difference value from the current and a previous default value or an incremental value per first cycle time, which incremental value was counted up or down previously in accordance with previous default values or difference values, to convert the difference value into control signals for the binary interface, a process which is repeated within several second cycle times, the total duration of which does not exceed the first cycle time of the value generator, and to dimension the number or frequency of the pulses or pulse flanks triggered per first cycle time according to the difference value concerned, preferably directly proportional to the difference value.

The new solution approach is therefore characterized in that no control circuit is used as in the prior art; rather the pulses for example of tracks A and B in incremental encoder simulation are output controllably in direct proportional to the incoming position default value. This direct correlation of the pulse output to the incoming default, in particular position values, gives the advantage that when the default value remains unchanged, no further pulses or pulse flanks are output. Toggling of a track with very high frequency due to unavoidable inherent dynamics of control circuits is prevented with the solution according to the invention. The number or frequency of the output pulses or pulse flanks is dimensioned directly according to the difference value of two default values of different preferably successive cycle times of the value generator. If the default remains unchanged (which can e.g. correspond to a stopped position), the difference has the value of zero so the pulse switching interface is not switched to generate pulses.

According to an advantageous embodiment of the invention the default value is simulated internally in the calculation and control means via integration of the difference value from the previous default value or incremental value, where the integration calculation process is spread divided over the second cycle times occurring within a first cycle time. Depending on the result of the integration calculation process, in each of these second cycle times it is checked whether the pulse switching interface should be triggered to output corresponding pulses or pulse flanks.

According to a particularly advantageous process variant, within the calculation and control means a variable incremental value is kept or managed which tracks the current default value within each cycle time according to the difference value. During the tracking process, depending on the incrementing or decrementing, pulse or pulse flanks are generated via the pulse switching interface.

To produce an absolute correlation, in particular an absolute position, in incremental (measurement) counting processes it is normal to generate a so-called reference pulse. For this according to one embodiment of the invention it is provided that the calculation and control means contain one or more reference constants. Using these the incremental value can be compared continuously, preferably within every second cycle time. If however a separate reference pulse output is provided at the pulse switching interface, this output can be actuated on fulfillment of a comparison condition. One advantage achievable as a result is that the reference pulse can be generated both synchronously and asynchronously from the other pulse sequences, for example the incremental encoder tracks A and B.

A further advantage in the introduction and administration of the incremental value is that this can be increased and reduced divided over the second cycle times occurring in each first cycle time. Here the incremental value serves also as a guide value, on the change of which and/or depending on the amount of the difference value, the pulse switching interface is optionally triggered to output corresponding pulses or pulse flanks in each second cycle time, or in some cases not triggered to do so if in the latter case for example the amount of the difference value is less than the number of the second cycle times occurring per first cycle time.

When the pulse generation process according to the invention is used as an incremental encoder simulation, the incremental value can advantageously be interpreted as an output position measurement value of an imaginary incremental length or angle measurement system. Because of the rapid calculation and control means feasible with modern technology, in particular with very short possible second cycle times, the incremental or tracked default or position value has a resolution which can be very much greater than that of a real incremental measurement system. This achieves inter alia, the advantage that the said reference or "zero" pulse can be generated with far higher precision than for example in the incremental encoder simulation known from the prior art as mentioned above, in which the reference pulse is triggered depending on and synchronously with one flank of the pulse tracks.

In order to reduce the incremental value or corresponding position value to a resolution corresponding to a real incremental encoder, in an advantageous refinement the incremental or position measurement value is adapted by a reduction of the resolution to four times the line count of the imaginary incremental measurement system. The resolution with which the internal incremental value generated according to the invention is tracked arises from the reciprocal value of a second cycle time. The ratio between the first and second cycle times in the invention can lie between 50 and 50000, preferably between 500 and 10000, in particular if the value generator is achieved by means of sequential logic or software and the calculation and control means by fixed wired hardware, optionally after programming. Alternatively or in addition implementation with very rapid processors and software running sequentially thereon also lies within the scope of the invention.

The object cited above is achieved by a digital electronic data processing apparatus lying within the scope of the general inventive concept which is characterized as follows:

by one or more digital data registers working time-discretely, which can be loaded and read repeatedly at equidistant transmission times with the generated default values (for example from the value generator) and other parameters (for example ratio of first to second cycle times, incremental encoder line count, output value for reference pulse etc), in which discrete working modes of the data register or registers correspond to the periods between the transition times of the above (longer) first cycle time, by a sampling system working time-discretely with calculation and control systems designed to access the data register or registers within each first cycle time and process the register content within shorter time periods which correspond to the said second cycle time, and by a pulse-generating logic to output pulse-like binary switching states.

The sampling system with the calculation and control system is thus intended for example to process the above incremental value with a considerably greater calculation speed than is the case in a value generator system with the time-discrete data register. To form the difference value essential for the process according to the invention, it is advantageous if the calculation and control system has a subtractor, a divider and a residual divider and/or one or another arithmetic unit which on the basis of the first cycle time obtains the default value from the data register and calculates the difference value using the default or incremental value tracked internally.

Suitably a coupling, in particular time-synchronous, between the value generator system with the data register and the sampling system for incremental encoder simulation can be implemented by an interrupt device which has priority over the calculation processes running in the calculation and control system on the basis of the second cycle time. Advantageously the logic pulse gate is controlled by a status variable administered in the calculation and control system and above all calculated at the end of each second cycle time, which variable is defined for a limited number of status values in preset sequence. The sequence can symbolize the movement or direction of rotation when used for incremental encoder simulation. Depending on the difference between the incremental values of a current second and a previous second cycle time, the status variable is kept constant or moved forwards or backwards by one step in the said value sequence. The pulse switching interface then allocates to the status variables the specific pulse pattern, for example two parallel phase-offset pulses at the gate output.

To achieve faster sampling times for the calculation and control system it is advantageous to program the process according to the invention in one or more complex programmable logic devices (CPLDs) and/or field-programmable gate arrays (FPGAs). For the pulse generation logic, simple and economic implementation possibilities are available by means of switching networks, for example in the form of programmable logic fields or fixed value memories (ROM). It is however particularly advantageous to integrate the pulse-generating logic constructionally with the calculation and control system as part of the above logic devices or gate arrays.

Further details, features, advantages and effects based on the invention arise from the description below of a preferred embodiment example of the invention in comparison with an example from the prior art, with reference to the drawings. These show:

DETAILED DESCRIPTION OF THE INVENTION

Figure 1:
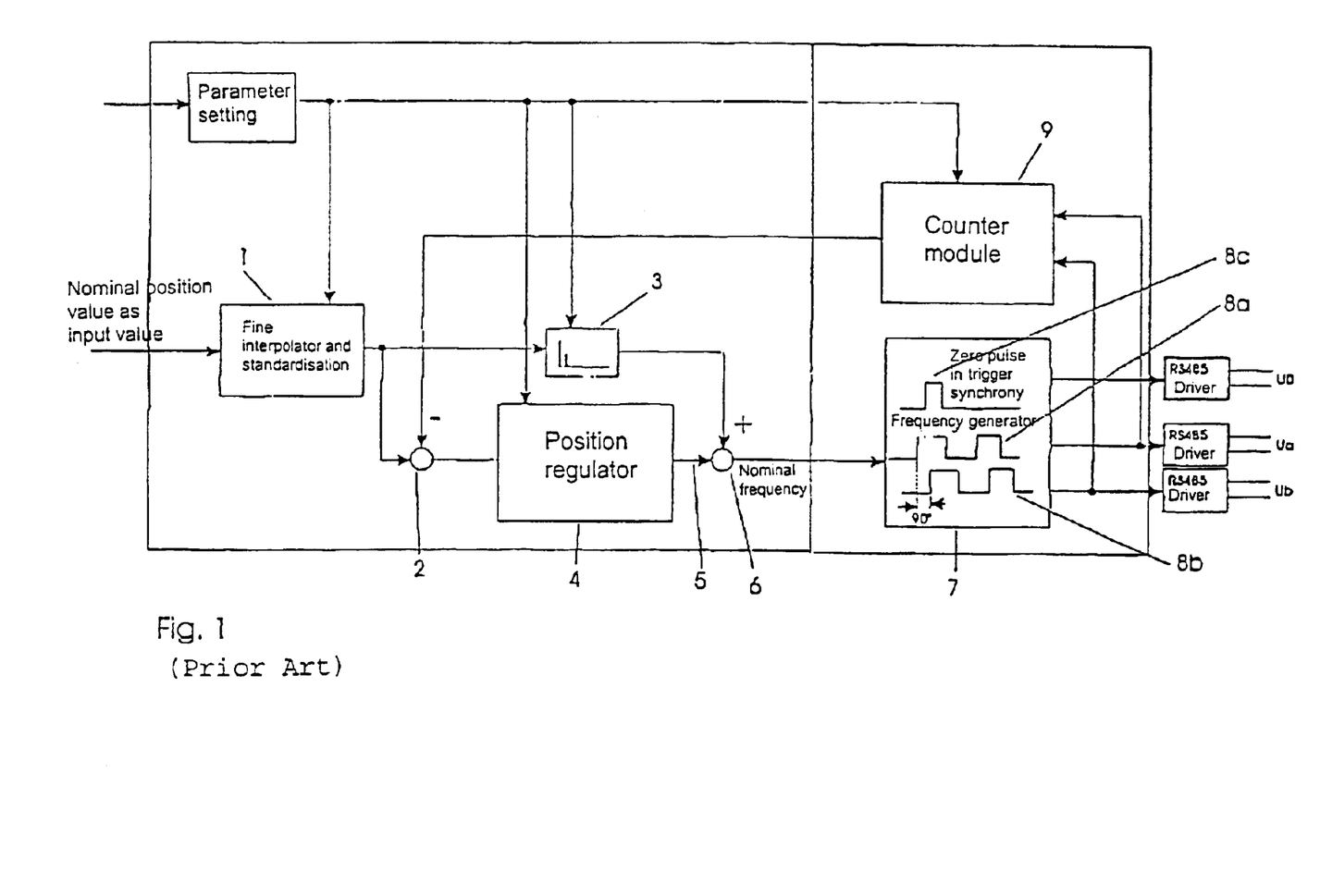
FIG. 1 a block diagram for an incremental encoder simulation known from the prior art.

According to FIG. 1 for an electric drive control circuit the incremental encoder simulation is normally previously implemented as follows: A position encoder or higher setpoint generator preferably first guides position set values to a fine interpolator 1 and then subjects these to standardization. The standardized output value of fine interpolator 1 is supplied to a nominal/actual comparator 2 and in parallel to this to a differentiator 3 as a precontrol. From the control deviation of the nominal/actual comparator 2, a position regulator 4 calculates a nominal frequency as a correcting variable 5 which in a summing element 6 is added to the output value of the differentiate 3. The addition result is output to a frequency generator 7. This generates two rectangular pulse sequences 8a, 8b offset by 90° which are supplied to known RS 485 drivers. The rectangular generator 7 also generates a reference or zero pulse 8c with a width of 90° or 270°. The direction of rotation is identified by specific sequences of pulse flanks (clockwise rotation from advancement of pulse Ua or track A over pulse Ub or track B, anti-clockwise from advancement of pulse sequence Ub over track A or pulse sequence Ua). The zero pulse is output once periodically for example per revolution period and can be synchronized with one of the pulse sequences, for example pulse sequence 8a or Ua. In parallel to the output the pulses are passed internally to a counter module 9 which generates from these a position actual value for the input to the nominal/actual comparator 2 or position regulator 4. For practical implementation the modules of fine interpolator or standardization 1, position controller 4 and differential precontrol 3 are stored as a software program in a microprocessor which can work with sampling times between more than 60 $\mu$sec and 2 msec. Counter 9 and frequency generator 7 however can be implemented purely as hardware. Reference is made to the comments in the introduction in relation to the disadvantages of this known solution.

Figure 2:
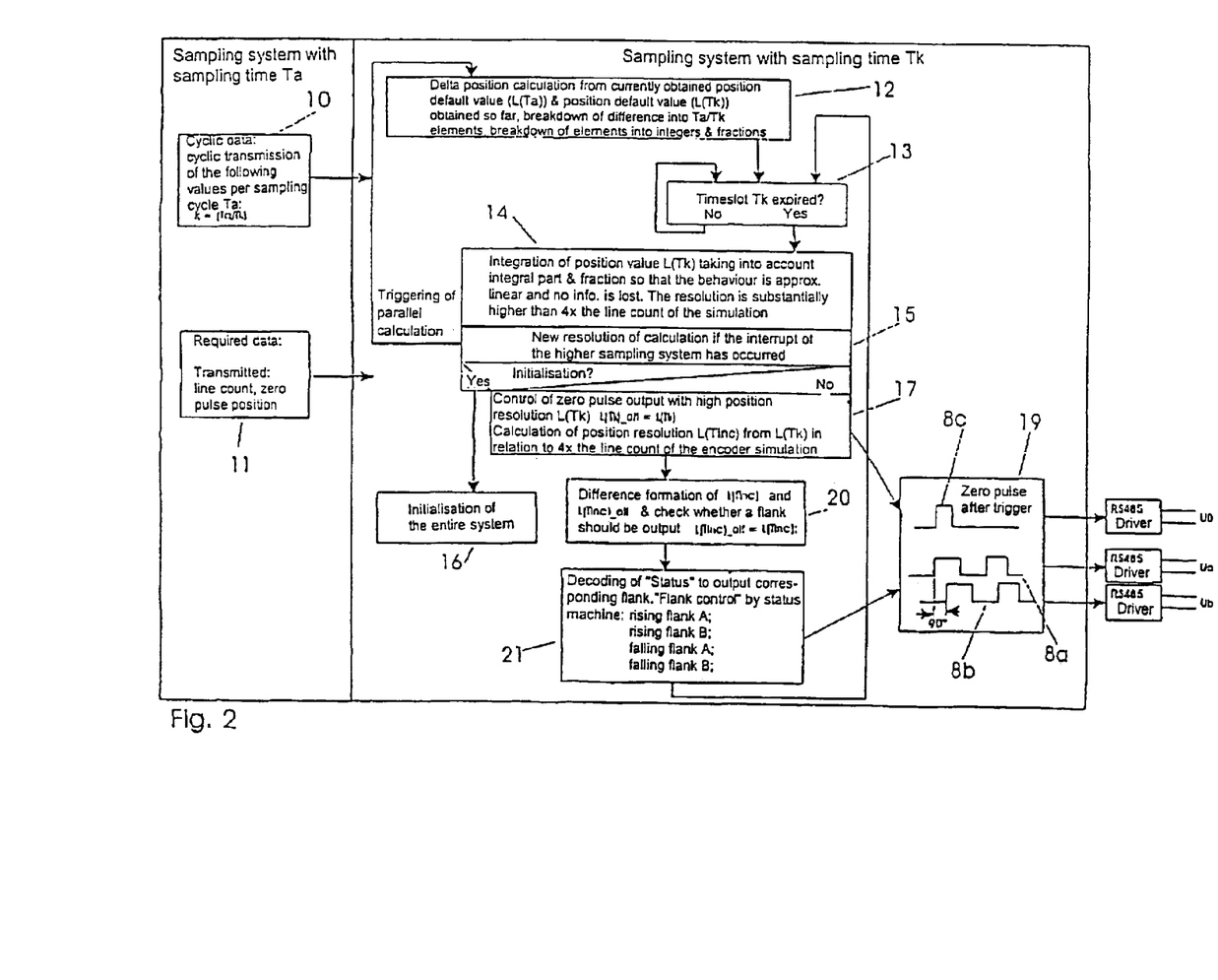
FIG. 2 a structure diagram for an incremental encoder simulation according to the invention.

According to FIG. 2 the entire system according to the invention is divided into two part systems, namely a first sampling system with the sampling time or first cycle time Ta and a second sampling system with the second sampling or cycle time Tk which is essentially smaller than the first cycle time Ta. The first sampling time can for example be a guide set-point generator for an electronic multi-motor drive system which via a data register 10 provides the data for the first sampling time Ta, a position default value L(Ta) and a ratio figure k for the two sampling or cycle times Ta and Tk. In a further data register 11 of the first sampling system, other required data such as the incremental encoder line count, zero pulse position etc. can be transmitted. The first sampling system is suitably implemented in processor technology with sequential command processing, where typical sampling periods can be achieved of the order of 125 $\mu$s to 2 ms. The second sampling system with the second cycle time Tk is suitably implemented as freely programmable hardware and can therefore work with a very high sampling rate (typically: Tk<200 nanoseconds), i.e. quasi-continuously to the first system, which with the first cycle time Ta in each cycle transmits a new position default value to the second sampling system for incremental encoder simulation. The first cycle time need not be constant but may fluctuate within certain limits even during operation, which advantageously reduces the hardware costs.

According to FIG. 2, in the calculation and control system of the second sampling system with cycle time Tk, in a first processing block 12 is calculated a difference value from the current position default value L(Ta) obtained and a position default value achieved by that time and kept internally as an incremental value L(Tk). Thus according to processing block 12 the difference value is broken down into individual sum part values, where the sum part values are each broken down where applicable into an integral part "Int" and a fraction (remainder "Rest"). On expiry of time loop 13 according to the second cycle time Tk, according to processing block 14 an integration takes place of the internal position or incremental value L(Tk) taking into account the integral part "Int" and the fraction "Rest" such that an approximately linear behavior is achieved without loss of information. The resolution can be essentially greater than four times the line count of the incremental encoder to be simulated. An interrupt device 15 can react to a request from the first sampling system when the first cycle time Ta has expired by triggering the position calculation from the current default value obtained and the default value achieved so far (incremental value L(Tk)). Similarly the first sampling system with the first cycle time (Ta) can request a stop initialization according to processing block (16). If no initialization takes place as the first time cycle Ta has not yet expired, according to processing block 17 a check is performed on whether to output a zero or reference pulse 8c and trigger the output interface 19 accordingly. According to processing block 17 a calculation is also made of the position resolution L(Tinc). The latter value constitutes a default value generated from the incremental value L(Tk) but in relation to four times the line count of the incremental encoder simulation. In a subsequent processing block 20 the current position default value L(Tinc), which is reduced to the real incremental encoder resolution, is compared with a previous position default value L(Tinc) also reduced in resolution. It is checked whether a pulse flank should be emitted. Depending on the check result, according to processing block 21, a status variable "Status" is set for the pulse pattern resulting from the check result. Depending on this via the output interface 19 the rectangular pulse sequences 8a, 8b with specific pattern are output.

Figure 3:
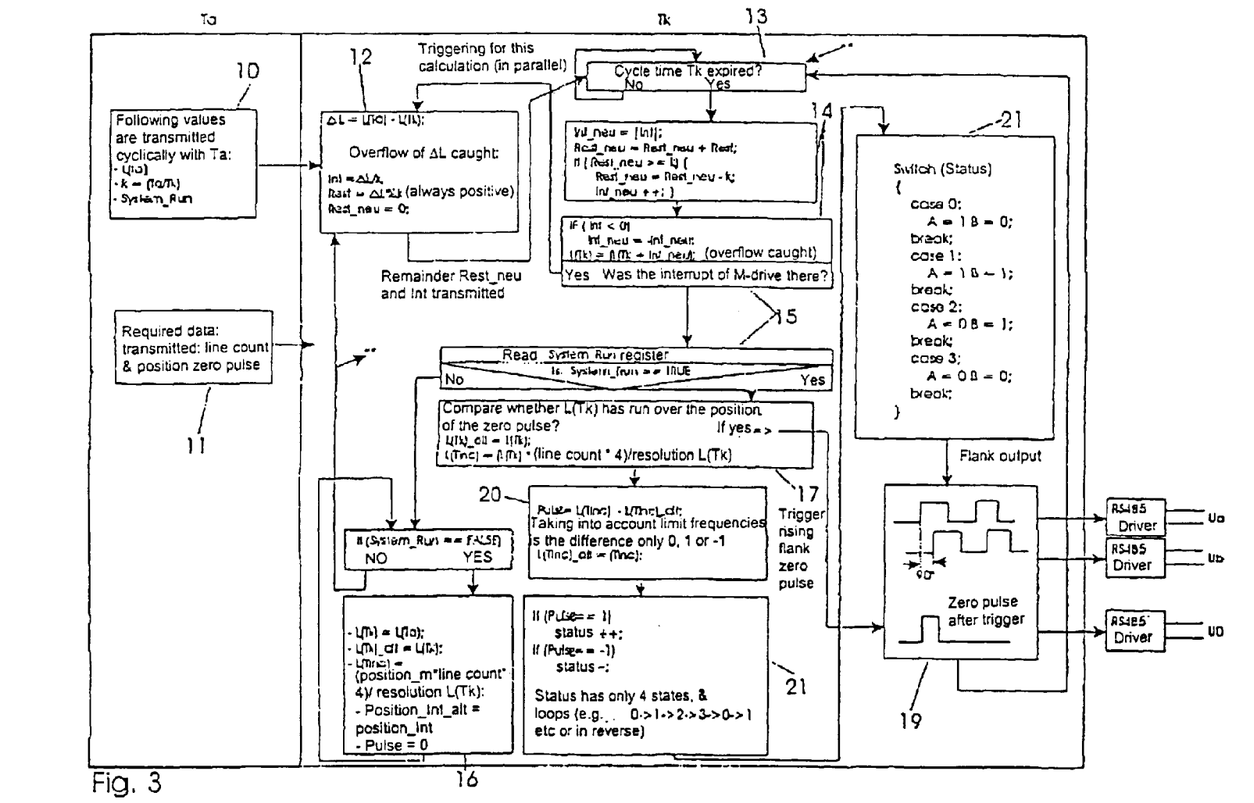
FIG. 3 a detailed view of this incremental encoder simulation in the form of a software structogram.

For further details reference is made to the detailed view shown in FIG. 3 where components or processing blocks of the same function, where they correspond to those in FIG. 2, have the same reference figures. By means of the algorithmic description used therein the expert can easily complete in detail the process sequence according to the invention.

Figure 4:
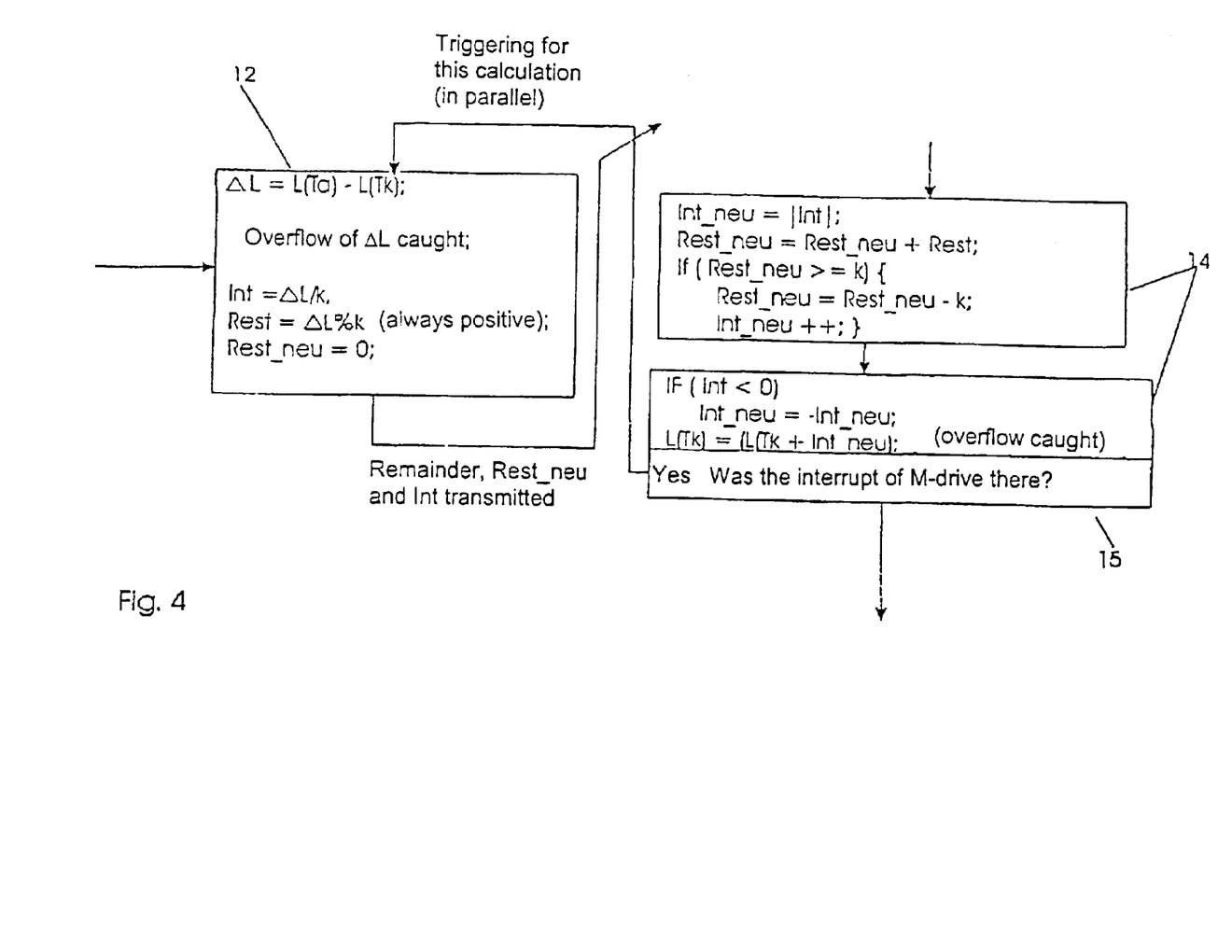
FIGS. 4–6 enlarged structogram sections from FIG. 3.

According to the enlarged view in FIG. 4, in the processing block 12 using the cyclic default position value L(Ta) and the incremental value L(Tk) achieved at the time of simulation, the following calculation operations are performed:

$$\delta L = L(Ta) - L(Tk)$$

$$Int = \delta L / k$$

$$Rest = \delta L \% k$$

Here it is suitable to provide in the calculation and control means a subtractor or other arithmetic unit advantageously set to catch any overrun of the difference value. The difference calculation is performed according to the invention with each repeated first cycle time Ta. Then the difference value is broken down into k=Ta/Tk sum part values, where this result is divided again into an integral part "Int, Int__neu" and a remainder "Rest, Rest__neu". By integration of the remainder the integral part is optionally incremented or decremented by one each time depending on direction of rotation. This enlargement or reduction of the integral part in turn causes a reduction in the remainder by the ratio k. This procedure shown algorithmically in FIG. 4 reliably prevents the loss of information contained in the default position value. Using the figured example below, the incremental encoder simulation according to the invention will be explained further.

After the occurrence of an interrupt on expiry of a first cycle time Ta the following values are transmitted for example:

k=5000

L(Ta)=35000

The current internal incremental value L(Tk) simulated so far amounts for example to 27000. Then as a one-off the following values are determined:

difference value δL=35000−27000=8000

Int=8000/5000=1

Rest=3000

Rest__neu=0

In the following samplings triggered at each second cycle time Tk, the internal incremental value L(Tk) alters as follows:

| Sampling cycle Tk | Rest__neu | Int | L(Tk) |
|---|---|---|---|
| 1 | 3000 | 1 | 27001 |
| 2 | 6000 => 1000 | 1 + 1 = 2 | 27003 |
| 3 | 4000 | 1 | 27004 |
| 4 | 7000 => 2000 | 1 + 1 = 2 | 27006 |
| 5 | 5000 => 0 | 1 + 1 = 2 | 27008 |
| 6 | 3000 | 1 | 27009 |
| 7 | 6000 => 1000 | 1 + 1 = 2 | 27011 |
| ... | ... | ... | ... |

Figure 5:
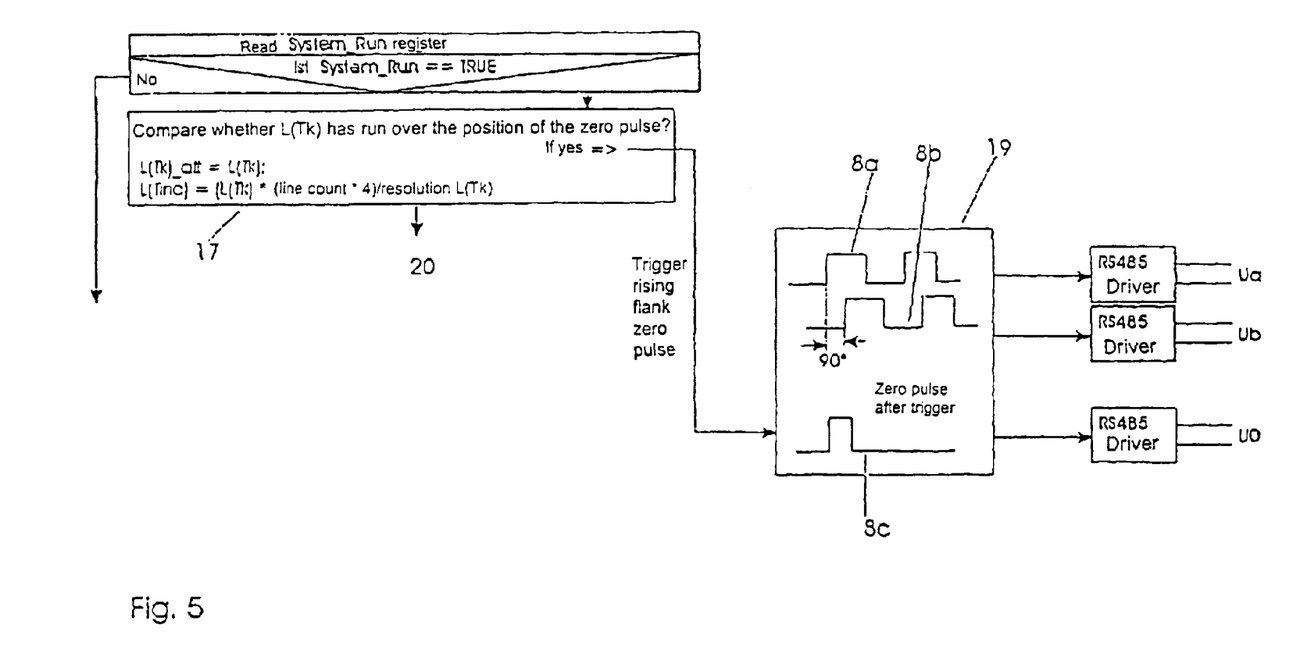

Thus an, integration is performed of the integral part Int of the sum part value of the difference value δL, where a new internal position or incremental value L(Tk) is formed which has a resolution which at this time can be very much greater than four times the line count of the real incremental encoder to be simulated. The calculation process with this increased resolution or precision is advantageous as it gives the possibility of outputting a zero or reference pulse with much higher precision than in with previously known incremental encoder simulations. In particular the reference pulse 8c, as is clear from FIG. 5 and the processing block 17 shown there, first two lines, can be output independently of the development of the two rectangular pulse sequences 8a, 8b, which was not the case in the prior art. With the process according to the invention the reference pulse 8c can be output with a higher precision than permitted by the line count resolution of a real incremental encoder or previously known systems for incremental encoder simulation. According to the invention as shown in FIG. 5, the output of the reference pulse 8c is asynchronous to the track signals or rectangular pulse sequences 8a, 8b. If the reference pulse is to be output only with a precision which corresponds to the resolution of the real incremental encoder or corresponding previously known simulations, the reference pulse 8c can be output synchronously to the rectangular pulse sequences 8a, 8b (behavior as a real incremental encoder).

After checking according to processing block 17 whether the incremental value L(Tk) corresponds to a reference constant stored in the calculation and control means and therefore a reference pulse 8c is to be output, the incremental value according to the second part of processing block 17 in FIG. 5 is reduced to a resolution which corresponds to four times the line count of the incremental encoder resolution. The line count can be selected freely and transferred according to FIG. 2 by the first sampling system to a separate data register 11.

Figure 6:
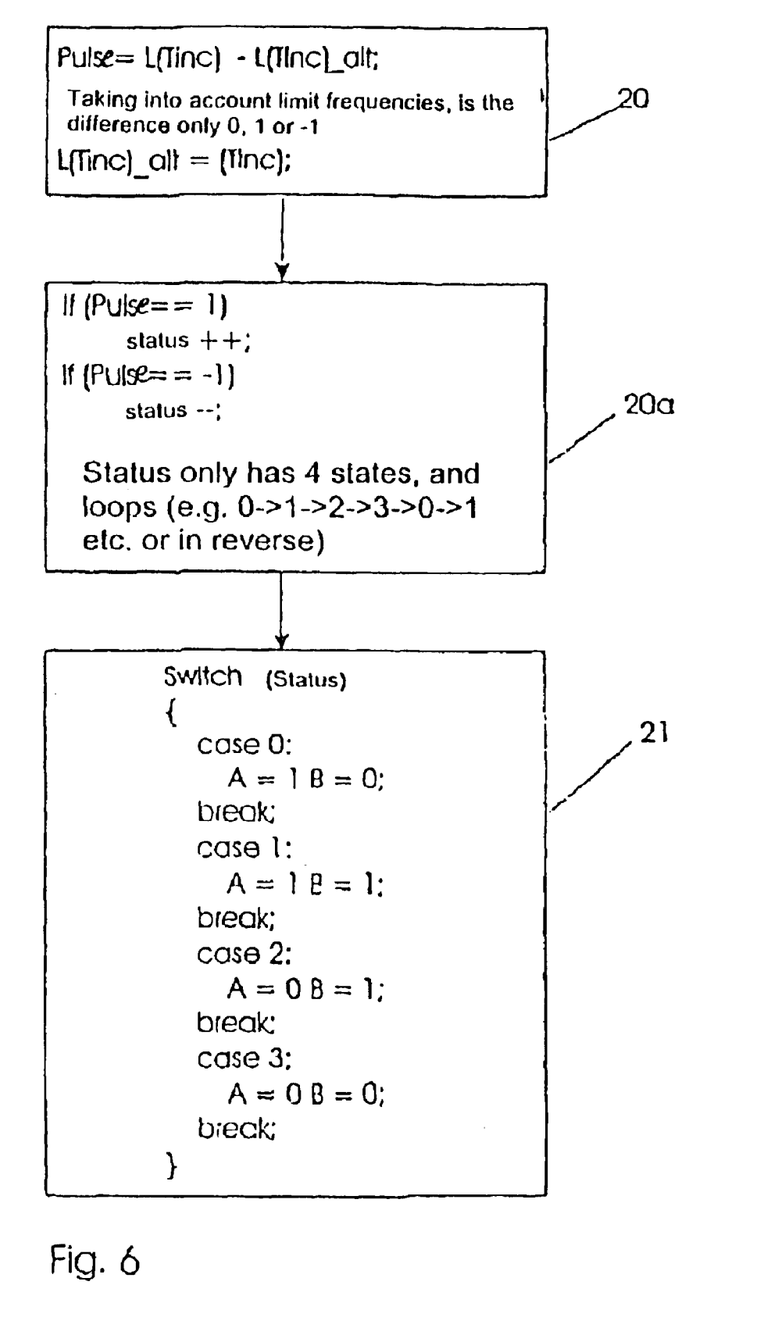

According to FIG. 6 a difference value "Pulse" is then formed from two incremental values "L(Tinc), L(Tinc)__alt" reduced in resolution (see processing block 20). In a further processing block 20a the difference value "Pulse" is analyzed and using the analysis result a status variable "Status" is set with four status values preset in a fixed sequence. For example depending on the direction of rotation or movement, the value sequence can be run bi-directionally in opposing directions. According to processing block 21 in FIG. 6 a link logic is then inserted as a function of the status variable "Status" where the track flanks A, B are obtained for rectangular pulse sequences 8a, 8b. Via the link logic according to processing block 21, according to the view of the output interface 19, the calculated pulse or flank pattern is now output.

As flanks A, B can only be output at each new second cycle time Tk, as a result the maximum theoretically possible frequency of incremental encoder simulation is determined (Fmax__t=1/(Tk*4)). This data must now be corrected down by an error amount calculated from the fluctuation width between the ideal first cycle time Ta and the first cycle time with only real precision. As in the upper frequency range the time quantization (determined by the second cycle time Tk) plays a very important role, the maximum default output frequency is given practically as follows: Fmax__p=1/(Tk*4*a) with a>1. For a typical Tk value of 120 nanoseconds for the second cycle time and a=4, this gives an Fmax__t of approximately 2 MHz and in practice an Fmax__p of over 500 kHz. With this frequency range the normal area of use of incremental encoder simulations can be fully covered. Thus in total the actual behavior of an incremental encoder can be simulated "closer to nature" or "more realistically" than in the prior art described initially. The rapid sampling times or small second cycle times Tk can be achieved by programming the described procedure to the complex logic devices or field-programmable gate arrays.

Abbreviations used:

L(Ta)—Position default value transmitted cyclically to the incremental encoder simulation.

k—Ratio of the two sampling times Ta and Tk.
Ta—Sampling time of the higher control/regulator as a source of the position default value.
Tk—Sampling time of the incremental encoder simulation.
L(Tk)—Position default value achieved by integration in the incremental encoder simulation (resolution as L(Ta)).
L(Tinc)—Position default value generated from L(Tk) but with the resolution of 4* line count of the incremental encoder simulation.
L(Tk)_alt, L(Tinc)_alt—Value lying one cycle time Tk back.

REFERENCE LIST

1 Fine interpolator
2 Nominal/actual value comparator
3 Differentiate
4 Position regulator
5 Correcting variable
6 Summing element
7 Frequency generator
8a,8b Rectangular pulse sequence
8c Reference or zero pulse
9 Counter
10 Data register
11 Data register
12 Processing block
13 Time loop
14 Processing block
15 Interrupt device
16 Processing block
17 Processing block
18 Output interface
20,20a,21 Processing block
A, B Pulse flanks

What is claimed is:

1. A process for automatic generation of several electrical pulses using numerical default values for simulating an incremental encoder for sequential digital counting of linear and angular displacement values using the pulses, with a value generator which outputs the default values repeatedly within each first cycle time, with calculation and control means cyclically detecting the default values and with a pulse switching interface controlled thereby which has one or more outputs for the pulses, the calculation and control means performing the process steps comprising:

(a) detecting a current default value and determining a difference value from the current and a previous default value or an incremental value per first cycle time, which value has been counted upwards or downwards according to previous default values;

(b) converting the difference value into control signals for the pulse switching interface within several second cycle times, the total duration of which does not exceed the first cycle time of the value generator; and (c) dimensioning the number or frequency of the pulses or pulse flanks to be output per first cycle time according to the difference value concerned.

2. Process according to claim 1, wherein the difference value is processed by means of an integration calculation process over the second cycle times occurring within a first cycle time, and in each of these second cycle times depending on the associated processing result the pulse switching interface is triggered to output corresponding pulses.

3. Process according to claim 1 or 2, wherein an incremental value is kept in the calculation and control means, which incremental value within each first cycle time is tracked from the default value in accordance with the difference value.

4. Process according to claim 3, wherein one or more reference constants are stored in the calculation and control means, with which the incremental value is compared continuously within each second cycle time, and by a separate reference pulse output at the pulse switching interface which is activated on fulfillment of a comparison condition synchronously or asynchronously to the other pulses or pulse flanks.

5. Process according to claim 3 wherein, for tracking, the incremental value is increased or reduced spread over the second cycle times occurring per first cycle time, where depending on the increase or reduction the pulse switching interface is triggered to output corresponding pulses.

6. Process according to claim 5 in that in at least one of the second cycle times occurring per first cycle time, the incremental value is increased or reduced by an allocated sum part value.

7. Process according to claim 6, wherein integral sum part values and any residual remainder are formed and the remainder is subjected to an integration calculation process over the second cycle times occurring per first cycle time, and depending on the integration result in the second cycle time the associated part sum value is increased or reduced and the remainder changed accordingly.

8. Process according to claim 7 wherein the incremental value is interpreted as a position measurement value according to an imaginary incremental length or angle measurement system.

9. Process according to claim 8, wherein an adjustment of the incremental or position measurement value to the imaginary measurement system by a reduction of a resolution, corresponding to a reciprocal value of the second cycle time, to four times the line count of the imaginary incremental measurement system.

10. Process according to claim 9 wherein the control signals for the pulse switching interface are formed as a function of a difference value between the incremental values, of a current second and a previous second cycle time.

11. Process according to claim 10, wherein the control signals or pulse switching interface are controlled by a status variable which can pass through a limited number of status values in preset bi-directional sequence, and depending on the difference value be held constant or have allocated to it the preceding or subsequent value in the sequence, and a particular pulse pattern allocated to each status value of the pulse switching interface.

12. Process according to claim 11 and further comprising the use to simulate an incremental encoder for a subsequent regulator of an electronic drive control circuit, where the default values form position nominal or actual values and the value generator forms a nominal value generator.

13. Process according to claim 12 wherein the ratio of first to second cycle times lies between 50 and 50000.

14. Process according to claim 3 wherein the difference value is broken down as a total sum into individual sum part values, where the number of part values corresponds to the ratio of the first to the second cycle time, and in each of the second cycle times one of the sum parts is processed to generate the control signals.

15. Process according to claim 14, wherein a remainder resulting from breakdown is integrated over the second cycle times, where in the second cycle times an allocated sum part value is changed according to the momentary integration result and the remainder reduced accordingly.

* * * * *